(12) United States Patent
Laporte et al.

(10) Patent No.: US 8,810,333 B2
(45) Date of Patent: Aug. 19, 2014

(54) MULTIBAND COUPLING ARCHITECTURE

(75) Inventors: Claire Laporte, Tours (FR); Hilal Ezzeddine, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 308 days.

(21) Appl. No.: 13/234,041

(22) Filed: Sep. 15, 2011

(65) Prior Publication Data

US 2012/0122410 A1    May 17, 2012

(30) Foreign Application Priority Data

Sep. 17, 2010   (FR) ...................................... 10 57448

(51) Int. Cl.
*H01P 5/12*   (2006.01)
*H03H 7/38*   (2006.01)

(52) U.S. Cl.
USPC ............................ 333/109; 333/112; 333/118

(58) Field of Classification Search
USPC ......... 333/109, 110, 112, 115, 116, 117, 118, 333/128
See application file for complete search history.

(56) References Cited

U.S. PATENT DOCUMENTS

| | | | |
|---|---|---|---|
| 3,833,866 A * | 9/1974 | Boutelant ..................... | 333/104 |
| 4,652,880 A * | 3/1987 | Moeller et al. ................ | 342/373 |
| 4,827,270 A * | 5/1989 | Udagawa et al. ............. | 343/853 |
| 6,745,046 B1 | 6/2004 | Eckert et al. | |
| 7,609,205 B2 * | 10/2009 | Haskell .......................... | 342/368 |
| 7,671,698 B2 * | 3/2010 | Dupont et al. ................ | 333/109 |
| 7,961,064 B2 * | 6/2011 | Kearns et al. ................. | 333/109 |
| 8,384,494 B2 | 2/2013 | Laporte et al. | |
| 2005/0212617 A1 * | 9/2005 | Chen ............................. | 333/116 |
| 2009/0128255 A1 * | 5/2009 | Dupont et al. ................ | 333/109 |
| 2011/0053524 A1 | 3/2011 | Manssen et al. | |
| 2012/0194293 A1 * | 8/2012 | Dupont et al. ................ | 333/109 |

OTHER PUBLICATIONS

French Search Report dated May 13, 2011 from corresponding French Application No. 10/57448.

* cited by examiner

*Primary Examiner* — Dean O Takaoka
(74) *Attorney, Agent, or Firm* — Wolf, Greenfield & Sacks, P.C.

(57) ABSTRACT

A multiband coupling circuit including: a number of paths equal to the number of frequency bands, each path having a first terminal and a second terminal; a third terminal and a fourth terminal; a number of distributed couplers equal to the number of paths, all couplers being identical and sized according to the highest frequency band, and each coupler including a first conductive line between first and second ports connected to the first and second terminals of the concerned path, and a second conductive line coupled to the first one between third and fourth ports; a first set of attenuations between the third ports of the couplers and the third terminal of the circuit; and an array of filters between the fourth ports of the coupler and the fourth terminal of the circuit.

24 Claims, 6 Drawing Sheets

MULTIBAND COUPLING ARCHITECTURE

CROSS REFERENCE TO RELATED APPLICATIONS

This application claims the priority benefit of French patent application number 10/57448 filed on Sep. 17, 2010 entitled "MULTIBAND COUPLING ARCHITECTURE," which is hereby incorporated by reference to the maximum extent allowable by law.

BACKGROUND OF THE INVENTION

1. Field of the Invention

The present invention generally relates to electronics and, more specifically, to radio transceiver systems. The present invention more specifically relates to a multiband coupler.

2. Discussion of the Related Art

A coupler is generally used to recover part of the power present on a so-called main or primary transmission line for another so-called coupled or secondary line, located nearby. Couplers are divided in two categories according to whether they are formed of discrete passive components (it is then spoken of lumped element couplers) or of conductive lines close to one another to be coupled (it is then spoken of distributed couplers). The present invention relates to the second category of couplers. The ports of the main line are generally designated as IN (input) and OUT (output). Those of the coupled line are generally designated as CPLD (coupled) and ISO (isolated).

In many applications, part of the power transmitted over a line needs to be used, for example, to control the power of an amplifier in a transmit system, to control the linearity of a transmit amplifier according to the losses linked to the reflection of an antenna, to dynamically match an antenna, etc.

The main parameters of a coupler are:

the insertion loss, which represents the transmission loss between ports IN and OUT of the main line (the insertion loss is then defined with the two other ports CPLD and ISO of the coupler loaded with a 50-Ω impedance);

the coupling, which corresponds to the transmission loss between ports IN and CPLD (the coupling is then defined with the two other ports OUT and ISO loaded with a 50-ohm impedance);

the isolation, which corresponds to the transmission loss between portions IN and ISO (the isolation is defined with the two other ports OUT and CPLD loaded with a 50-ohm impedance);

the directivity, which corresponds to the difference in transmission loss between ports ISO and CPLD, from port IN; and the matching, which represents the reflective loss on the four ports.

An ideal coupler has an infinite directivity, that is, no power is present on the port of its secondary line located in front of the output port of its main line when a signal flows from the input port to the output port of this main line. In practice, a coupler is called directional when its directivity is sufficient (typically greater than 20 dBm) for the powers recovered on the accesses of its secondary line to enable to distinguish the power flow direction in the main line. When the two ports of the secondary line of the coupler are used to simultaneously have the power information, the coupler is called bidirectional.

Radio transceiver devices are more and more capable of operating in several frequency bands. Such is for example the case in mobile telephony, where cell phones have evolved from dual-band to tri-band, and now to quad-band.

The transceiver chain then comprises as many paths as the device is capable of processing frequency bands at once in transmit and receive mode. Each path is associated with a coupler sized according to the frequency band to be processed. In particular, the lengths of the main and secondary lines depend on this frequency band. This need for a different sizing of the couplers complicates the manufacturing. Further, with couplers of different length, the directivity varies from one coupler to the other, which is not desirable.

In a coupler, if the two ports of its secondary line and the output port of its main line are perfectly matched, no parasitic reflection occurs. Such a perfect matching can unfortunately not be obtained in practice. In particular, the port from which the portion of the power is sampled by coupling is seldom ideally matched. As a result, parasitic reflections generate errors on the recovered data.

A mismatch of the port of the secondary line of the coupler from which the information is sampled may have different origins. Most often, the coupler is placed on an insulating substrate (for example, of printed circuit type) to be associated with other circuits. It is then not possible to guarantee a perfect matching (typically 50Ω) of the measurement port (CPLD). Further, if the couplers have different sizes, this matching risks to vary from one coupler to another.

Further, in a multiband coupler, the antennas connected at the output of the main lines introduce an additional coupling. The greater this coupling (the poorer the isolation between the two antennas), the more altered the measurement results. The coupler is then not sufficiently frequency-selective for one path over the other.

SUMMARY OF THE INVENTION

An embodiment overcomes all or part of the disadvantages of multiband radio transceiver structures using one coupler per path.

Another embodiment decreases the bulk of a multiband coupling structure.

Another embodiment improves the selectivity in terms of frequency for the different paths.

Another embodiment improves the reliability of measurements by making them little sensitive or totally insensitive to a variation of the matching of the circuits connected to the measurement port.

Thus, an embodiment provides a multiband coupling circuit comprising:

a number of paths equal to the number of frequency bands, each path having a first terminal and a second terminal;

a third terminal and a fourth terminal;

a number of distributed couplers equal to the number of paths, all couplers being identical and sized according to the highest frequency band, and each coupler comprising a first conductive line between first and second ports connected to the first and second terminals of the concerned path, and a second conductive line coupled to the first one between third and fourth ports;

a first set of attenuators between the third ports of the couplers and the third terminal of the circuit; and an array of filters between the fourth ports of the couplers and the fourth terminal of the circuit.

According to an embodiment, the circuit further comprises a second set of attenuators associated with the filter array.

According to an embodiment, said array comprises, for each path, a filter sized to let through the frequency band of the concerned path, in series with an attenuator.

According to an embodiment, said array comprises:

for each path except for the last one, a low-pass filter for the frequencies of the current path and of the paths of lower rank in series with an attenuator, this series association being, for the first path, connected to the fourth terminal of the circuit; and for each path except for the first one, a high-pass filter for the frequencies of the current path and of the paths of higher rank, connected to the low-pass filter of the path of lower rank.

According to an embodiment, the filters and attenuators are sized based on the following relations:

isolation $I_i$ in band i is equal to isolation $IB_i$ of the coupler of path i, plus attenuation $Att_i$ provided by the attenuator of path i;

the directivity in band i corresponds to coupling factor $CB_i$ of the coupler of path i, minus isolation $I_i$ in band i such as calculated hereabove, and is greater than or equal to the minimum directivity DIR desired for all the paths.

According to an embodiment, the filters and attenuators are sized by further taking into account the fact that the coupling of an antenna coupled to the second port of the coupler of a path i, in a frequency band of another path j, corresponds to the sum of coupling $X_{ij}$ between the antennas connected to the second ports of the couplers of paths i and j, of coupling factor $C_jB_i$ of the coupler of path j in band i, of attenuation $AF_jB_i$ introduced by the filter of path j in band i, and of attenuation $Att_j$ introduced by the attenuator of path j, and is smaller than or equal to isolation $I_i$ in band i.

According to an embodiment, the filters and attenuators are sized by further taking into account the fact that that the coupling of an antenna coupled to the second port of the coupler of a path i, in a frequency band of another path j, is smaller than or equal to isolation $I_i$ in band i and corresponds:

for any path j of smaller rank than rank i, to the sum of coupling $X_{ij}$ between the antennas connected to the second ports of the couplers of paths i and j, of coupling factor $C_jB_i$ of the coupler of path j in band i, of attenuation $LF_jB_i$ introduced by the low-pass filter of path j in band i, and of attenuation $Att_j$ introduced by the attenuator of path j; and for any path j of rank greater than rank i, to the sum of coupling $X_{ij}$ between the antennas connected to the second ports of the couplers of paths i and j, of coupling factor $C_jB_i$ of the coupler of path j in band i, of the sum of attenuations $LF_jB_i$ introduced by the high-pass filters of paths j−1 to i in band i, and of attenuation $Att_j$ introduced by the attenuator of path j.

According to an embodiment, the circuit further comprises a set of resistive splitters in cascade between the filters and the fourth terminal.

According to an embodiment, a terminal of the splitter associated with the last path is grounded by a resistive element having a value which is triple that of respective resistive elements of the splitters.

According to an embodiment, the filters and splitters are sized based on the following relations:

isolation $I_i$ in band i is equal to isolation $IB_i$ of the coupler of path i, plus the sum of the attenuations provided by the splitters between the first path and path i;

the directivity in band i corresponds to coupling factor $CB_i$ of the coupler of path i, minus isolation $I_i$ in band i such as calculated hereabove, and is greater than or equal to the minimum directivity DIR desired for all the paths; and the coupling of an antenna connected to the second port of the coupler of a path i, in a frequency band of another path j, corresponds to the sum of coupling $X_{ij}$ between the antennas connected to the second ports of the couplers of paths i and j, of coupling factor $C_jB_i$ of the coupler of path j in band i, of attenuation $AF_jB_i$ provided by the filter of path j in band i, and of the sum of the attenuations provided by the splitters between the first path and path j, and is smaller than or equal to isolation $I_i$ in band i.

The foregoing and other objects, features, and advantages will be discussed in detail in the following non-limiting description of specific embodiments in connection with the accompanying drawings.

DETAILED DESCRIPTION

The same elements have been designated with the same reference numerals in the different drawings. For clarity, only those elements which are useful to the understanding of the present invention have been shown and will be described. In particular, the upstream and downstream circuits of the multiband coupling structure have not been detailed, the present invention being compatible with usual circuits.

Figure 1:
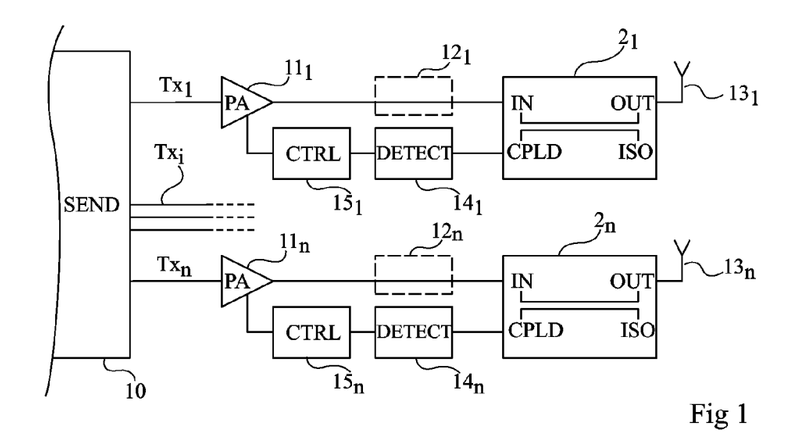
FIG. 1 is a simplified representation in the form of blocks of a radio transmission chain of usual type.

FIG. 1 is a block diagram of a usual example of a transmission chain capable of transmitting in several frequency bands. This type of circuit for example equips communication devices of mobile telephony type.

An electronic transmission circuit 10 (SEND) is capable of generating signals $Tx_i$ (with i ranging between 1 and n) to be transmitted according to the frequency band used. These signals are sent onto power amplifiers $11_i$ (PA) having their respective outputs crossing various processing and matching circuits $12_i$ illustrated in dotted lines. These circuits $12_i$ comprise, among others and non-limitingly, impedance matching devices for transmit antennas $13_i$. To be able to adjust the power of amplifier $11_i$ or of any other element (adjustable impedance matching network, etc.), a coupler $2_i$ is interposed, for example, between the output of circuit $12_i$ and the corresponding antenna. Path splitters (not shown) may be interposed between the coupler and the antenna. Such splitters are used to separate the transmission from the reception, which is processed by a radio reception line, not shown.

Each coupler $2_i$ comprises a main line interposed between amplifier $11_i$ and antenna $13_i$ (or between the output of circuit $12_i$ and antenna $13_i$). A so-called input port or access IN is located on the side of amplifier 11 while a so-called port or access OUT (sometimes also called DIR) is on the side of antenna $13_i$. A coupled or secondary line of the coupler samples part of the power of the main line. A port CPLD of the coupler, corresponding to the end of the secondary line on the side of port IN, provides information relative to the measurement. This information depends, among others, on the loss due to the reflection of the antenna. It being a directional coupler, end ISO of the secondary line, on the side of port OUT, is not used. It is loaded with a reference impedance of the circuit (typically 50 ohms). In the example of FIG. 1, the measurement, which indicates the reflection loss generated by the antenna, is used to adapt the amplifier gain by means of a circuit $14_i$ (DETECT) for detecting the level on port CPLD of the corresponding coupler and of a circuit $15_i$ (CTRL) receiving the information measured by the detector and controlling the gain of the corresponding amplifier $11_i$.

The measurement of the reflection loss of the antenna may also enable a dynamic matching of the antenna if said antenna has this functionality.

As indicated previously, the multiplication of the control and detection circuits adversely affects the miniaturization of radio transmission lines. Further, in most applications and especially in mobile telephony, a single line is used at a given time, so that it would be desirable to be able to share at least the control and detection circuits.

Figure 2:
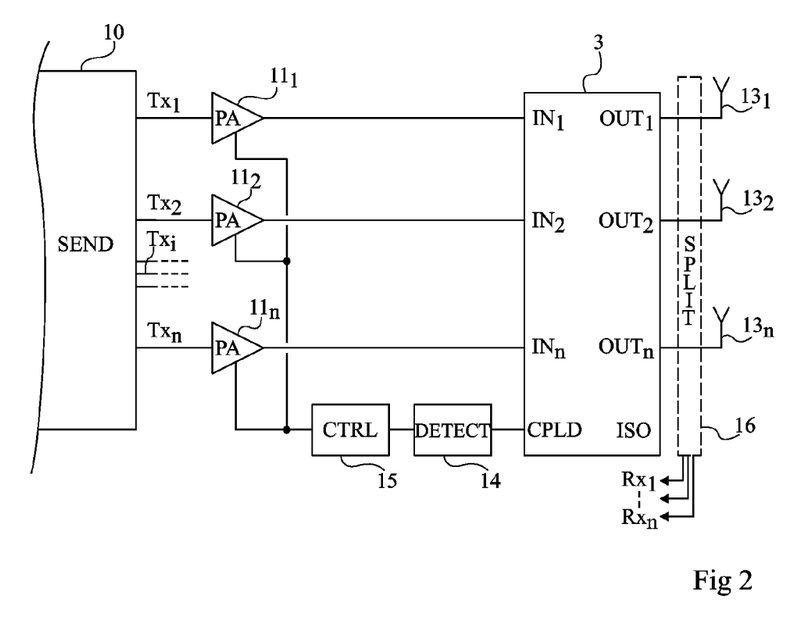
FIG. 2 is a block diagram of an embodiment of multiband radio transmission chain.

FIG. 2 is a block diagram to be compared with that of FIG. 1 illustrating a radio transmission chain with a multiband coupling circuit.

As previously, a circuit 10 of n paths is capable of generating signals $Tx_i$ (with i ranging between 1 and n) on different frequency bands which are sent onto adjustable-gain transmit amplifiers $11_i$. The respective outputs of amplifiers $11_i$ are sent onto n inputs $IN_i$ of a multiband coupling circuit 3. This circuit comprises the same number of outputs $OUT_i$ intended to be connected to antennas $13_i$ assigned to the different bands. Circuit 3 only comprises one port CPLD and one port ISO. Port CPLD is connected to a detector 14 having its output connected to a control circuit 15. The output of control circuit 15 is connected to the respective gain control inputs of amplifiers $11_i$. Signal switching circuits may be interposed between control circuit 15 and the gain control inputs of amplifiers $11_i$.

In the example of FIG. 2, a splitter 16 (SPLIT) has been symbolized in dotted lines to separate transmit flows from receive flows at the level of antennas $13_i$ and provide signals $Rx_i$ to a receive line, not shown.

To simplify the description, the paths, frequency bands, and different components of the coupling circuit are identified by their rank i (between 1 and n).

Figure 3:
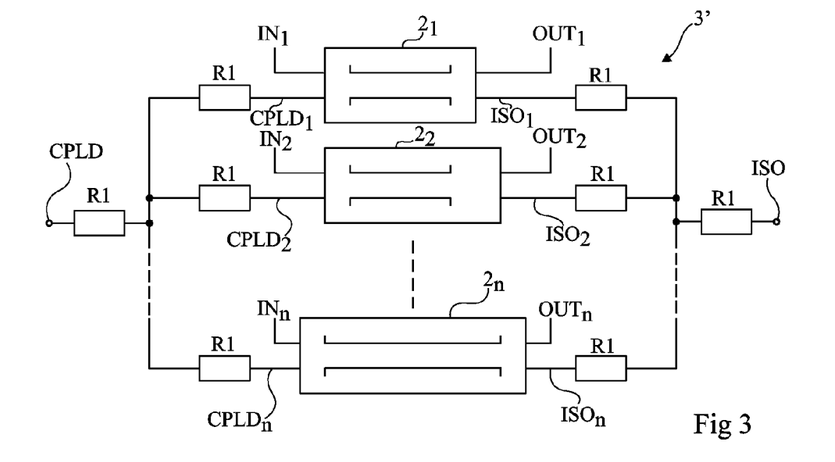
FIG. 3 illustrates a first multiband coupling circuit solution.

FIG. 3 shows a usual example of a multiband coupling circuit 3' capable of being used in the chain of FIG. 2. Circuit 3' comprises n couplers $2_i$ having the respective inputs and outputs of their main lines defining the different terminals $IN_i$ and $OUT_i$ of circuit 3'. Terminals $CPLD_i$ and $ISO_i$ of the different couplers $2_i$ are connected, via an impedance matching network, to terminals CPLD and ISO of circuit 3'. Typically, each terminal $CPLD_i$ is connected to terminal CPLD by a series association of two resistors R1, one of these resistors being shared by all connections. The same structure is reproduced on the side of terminal ISO. All resistors R1 have the same value. This value is calculated according to the impedance R desired for the coupler (typically 50 ohms) and corresponds to $R1=R(n-1)/(n+1)$. With such values, an attenuation between two ports which depends on the number of bands is obtained.

Figure 4:
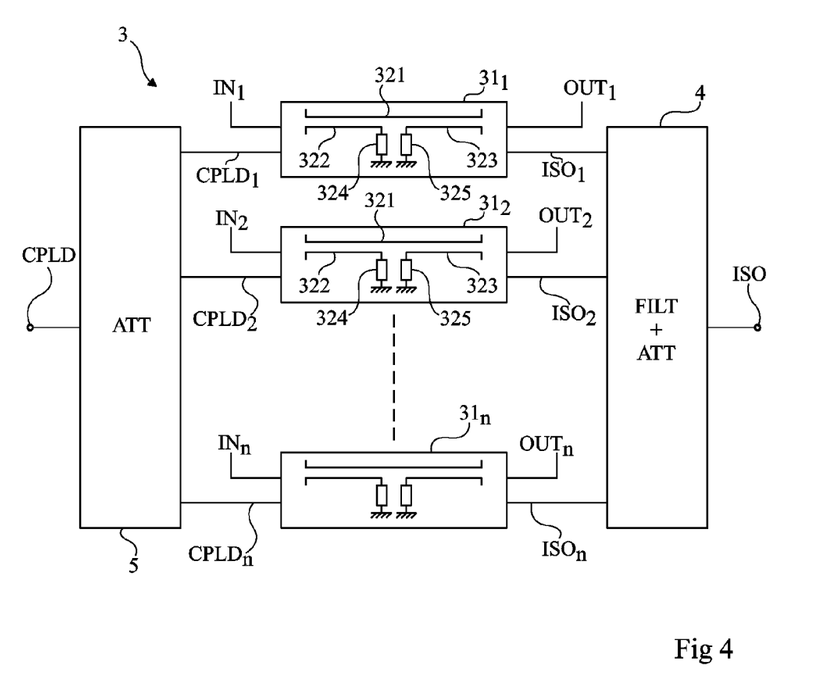
FIG. 4 schematically shows in the form of blocks an embodiment of a multiband coupling circuit.

FIG. 4 schematically shows in the form of blocks an embodiment of a coupling circuit.

As in the circuit of FIG. 3, a distributed coupler $31_i$ is assigned to each frequency band or path. Couplers $31_i$ for example have identical lines (same shape, material, etc.) of equal lengths. Due to the fact for the line lengths to be identical, all couplers have the same intrinsic directivity, and thus the coupling circuit has a directivity independent from the frequency band. However, it may also be provided to individualize the sizing of each coupler according to the concerned path.

Each port $ISO_i$ is connected to terminal ISO of circuit 3 by an array 4 of filters (FILT) and attenuators (ATT) or of filters and splitters. On the side of terminal CPLD, each port $CPLD_i$ is connected to terminal CPLD of circuit 3 by an array 5 of attenuators (ATT).

The function of array 4 is, for each path, to filter the signals that are outside of its frequency band, that is, that are capable of being received by the antennas which are not being used in the transmission.

Several embodiments of the filter array will be described in relation with FIGS. 6, 7, and 10.

According to a simplified embodiment, all couplers are identical to coupler $2_1$ of FIG. 3.

Preferably, couplers $31_i$ have an improved structure in terms of directivity to avoid the occurrence of given malfunctions, for example, a detection error which is likely to occur if the reflection loss corresponds to an attenuation greater than the directivity (reflected signal more attenuated than the directivity factor).

Figure 5:
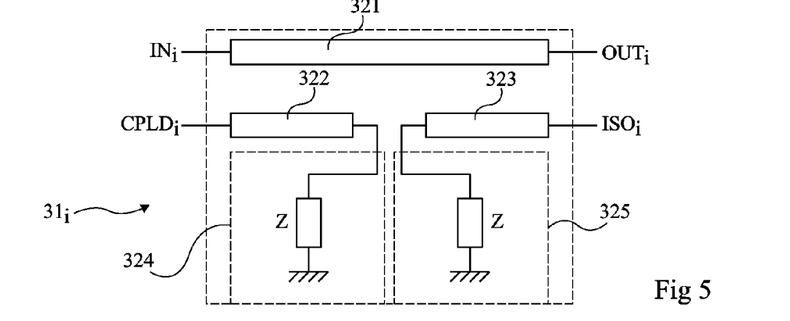
FIG. 5 shows an embodiment of a coupler of the circuit of FIG. 4.

FIG. 5 shows an embodiment of a coupler $31_i$ of improved directivity, of the type used in the circuit of FIG. 4. Distributed coupler $31_i$ comprises a main line 321, intended to be interposed on the transmission line by its two respective input and output ports $IN_i$ and $OUT_i$. A secondary line, formed of two sections 322 and 323 parallel to line 321, defines ports $CPLD_i$ and $ISO_i$ intended to convey the information proportional to the power transmitted in line 321. Sections 322 and 323 are preferably symmetrical, that is, of same length. Their respective ends are connected to ports $CPLD_i$ and $ISO_i$. Their respective internal ends are connected to attenuators 324 and 325 forming an impedance Z between these internal ends and the ground.

Attenuators 324 and 325 are preferably selected to provide an attenuation at least equal to half the coupler directivity. Taking the example of a coupler having a −30-dB directivity, this means that attenuators 324 and 325 each are of at least 15 dB. The coupler structure shown in FIG. 5 enables to do away with the influence of the loads present on ports $CPLD_i$ and $ISO_i$.

In practice, a coupler $31_i$ is made in the form of conductive tracks supported by an insulating substrate. Most often, the lines are rectilinear and their length is selected according to the operating frequency of the coupler and to the desired coupling level. A coupler such as described in relation with FIG. 5 corresponds to the bidirectional coupler described in patent application FR no 2923950 (B8533-07-TO-295/296) or in patent application US no 2009/0128255, which applications are incorporated herein by reference.

Figure 5A:
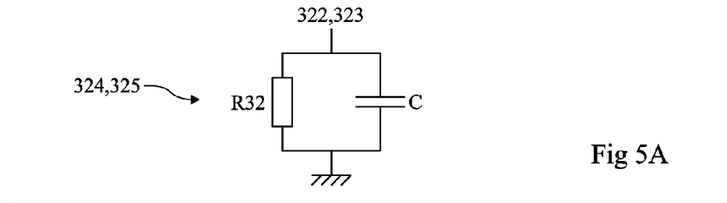
FIG. 5A shows a variation of an attenuator of the circuit of FIG. 5.

FIG. 5A shows an embodiment of an attenuator 324 or 325.

This attenuator is formed of a resistor R32 in parallel with a capacitor C between the internal end of the concerned section and the ground. For example, resistance R32 is 50 ohms and capacitance C is on the order of one picofarad.

Figure 6:
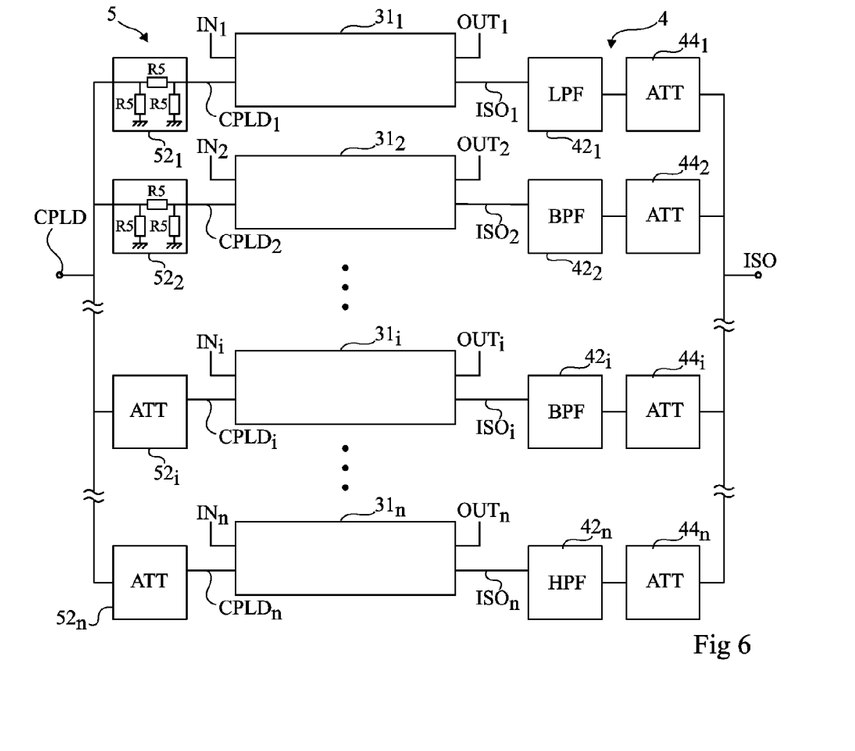
FIG. 6 details an embodiment of the coupling circuit of FIG. 4.

FIG. 6 is a block diagram of an embodiment of the coupling circuit of FIG. 4.

It is assumed that attenuator array 5 comprises one attenuator 52 per path. For example, for each path (between each terminal $CPLD_i$ and terminal CPLD), a pi-pad formed of three resistive elements $R_5$ of same value is used. A first resistor connects terminal $CPLD_i$ to terminal CPLD. The two other resistors respectively ground terminals $CPLD_i$ and CPLD.

On the side of terminal ISO, array 4 comprises, for each path i, a filter $42_i$ and an attenuator $44_i$. The attenuators are, for example, pi-pads similar to those formed on the side of terminal CPLD.

Filter $42_i$ of each path is sized to conduct only the frequency band of the concerned path.

To simplify the description, it is assumed that the n paths of FIG. 6 are arranged in an increasing frequency order. First filter $42_1$ then is a low-pass filter (LPF) having a cut-off frequency selected to only let through the passband of the first path. Each filter $42_2$ to $42_{n-1}$ is a bandpass filter (BPF) sized to only let through the corresponding frequency band. Last filter $42_n$ is a high-pass filter (HPF) sized to only let through the frequencies of the last band. Of course, low-pass filter $42_1$ and high-pass filter $42_n$ may be replaced with bandpass filters letting through the frequencies of the concerned band.

Such a structure enables the parasitic signal originating from the coupling between the antennas to be, on the side of terminal ISO, cut off by the filters.

The sizing of the filters and of the attenuators of array 4 depends on the intrinsic characteristics of coupler $31_i$ and on the parasitic coupling of the antennas with one another.

Based on these intrinsic characteristics, the following are known (measurable):

$X_{ij}$, the coupling between antennas $13_i$ and $13_j$;

$CB_i$, the total coupling coefficient of the circuit in band i (difference between the signals present on terminals $IN_i$ and CPLD);

$C_iB_j$, the coupling of coupler $31_i$ in frequency band j (difference between the signals present on terminals $IN_i$ and $CPLD_i$);

$IB_i$, the isolation of coupler $31_i$ in band i (difference between the signals present on terminals $IN_i$ and $ISO_i$); and DIR, the minimum directivity desired for all bands.

Noting the characteristics of filters $42_i$ and of attenuators $44_i$ as follows:

$Att_i$, the attenuation provided by attenuator $44_i$; and $AF_iB_j$, the attenuation provided by filter $42_i$ in band j, the following isolation, directivity, and coupling relations obtained by circuit 3 may be expressed as follows:

the total isolation of circuit $I_i$ in band i (difference between the signals present on terminals $IN_i$ and ISO) corresponds to the isolation of the coupler of path i, plus the attenuation provided by attenuator $44_i$ ($I_i=IB_i+Att_i$);

the directivity in band i corresponds to the coupling factor of the coupler of path i, minus the isolation in band i such as calculated hereabove—this directivity must be greater than or equal to the minimum directivity DIR desired for all the paths ($CB_i-I_i \geq DIR$); and the coupling of the antenna of path i in the frequency band of each other path j corresponds to the sum of coupling $X_{ij}$ between antennas $13_i$ and $13_j$, of coupling factor $C_jB_i$ of coupler $31_j$ in band i, of attenuation $AF_jB_i$ provided by filter $42_j$ of path j in band i, and of attenuation $Att_j$ provided by attenuator $44_j$. This sum ($X_{ij}+C_jB_i+AF_jB_i+Att_j$) must be smaller than or equal to isolation $I_i$ in band i.

The system of equations obtained for the different bands enables determining the value to be given to the filters and to the attenuators.

On the side of network 5, the attenuation is selected to ensure the coupling level desired in each band and to ensure the desired impedance matching between the different bands.

Figure 7:
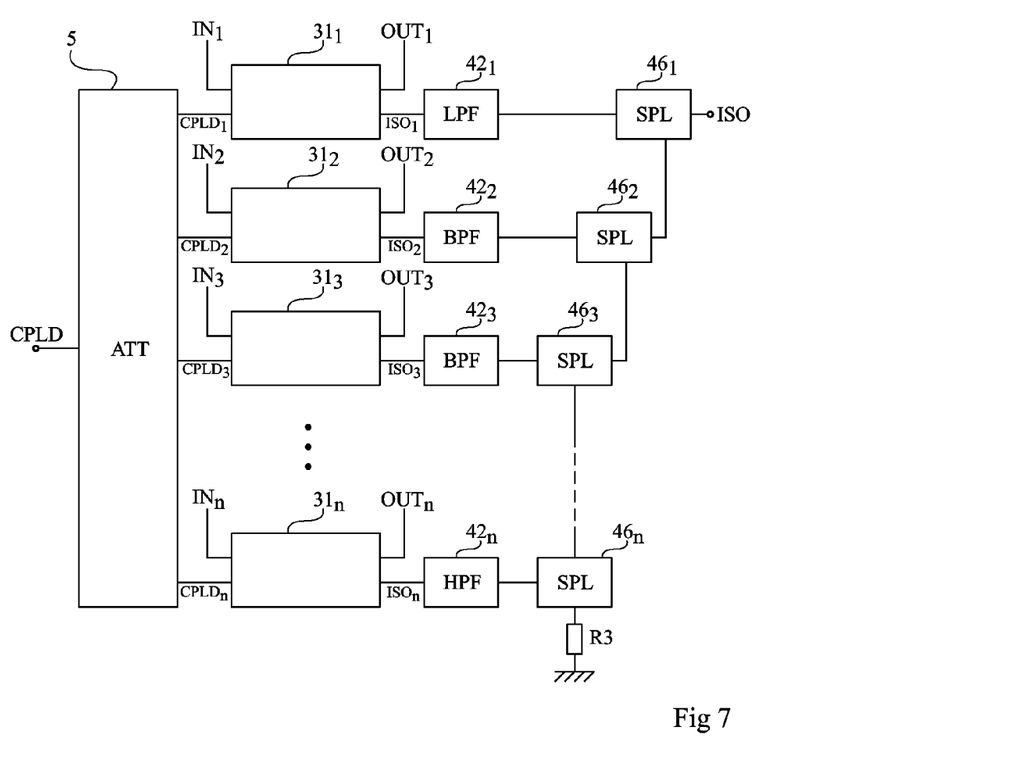
FIG. 7 details another embodiment of the coupling circuit of FIG. 4.

FIG. 7 shows the diagram of another embodiment of a coupling circuit.

The difference with the embodiment of FIG. 6 is that attenuators 44 are replaced with splitters $46_i$ (SPL-splitter). Splitters 46 are, for example, resistive splitters, each comprising three resistors in a T structure. The array of filters 42 is not modified.

Figure 8:
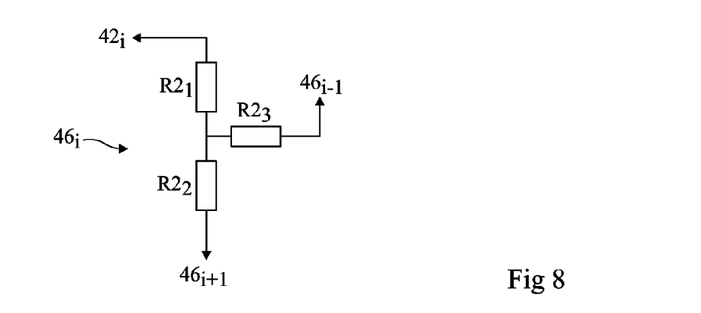
FIG. 8 shows an embodiment of a resistive splitter of the circuit of FIG. 7.

FIG. 8 shows an embodiment of a splitter $46_i$.

The terminal (arbitrarily called output terminal) on the side of terminal ISO of each filter $42_i$ is connected to an end of a first resistor $R2_1$ of splitter $46_i$ of the concerned path. First resistor $R2_1$ is in series with a second resistor $R2_2$ of the same splitter may, except for that of splitter $46_n$ of the last path, to be connected to third resistor $R2_3$ of splitter $46_{i+1}$ of the next path. Except for splitter $46_1$ of the first path, the junction point of first resistor $R2_1$ and second resistor $R2_2$ of a splitter $46_i$ is thus connected, by third resistor $R2_3$ of this splitter, to second resistor $R2_2$ of splitter $46_{i-1}$ of the previous path.

Third resistor $R2_3$ of splitter $46_1$ of the first path is connected to terminal ISO of circuit 3. The second resistor of splitter $46_n$ of the last path is grounded by a resistor R3 (FIG. 7).

The value of resistance R3 corresponds to three times the values of resistances R2. The resistive splitters $46_i$ thus formed are in cascade between the different paths.

Functionally, each coupler $31_i$ sees, on its port $ISO_i$, a resistor of value R3, and terminal ISO of circuit 3 also sees a resistor of value R3.

The sizing of a coupling circuit such as illustrated in FIG. 7 is for example performed as follows.

Using the notations defined in relation with FIG. 6, and noting $Spl_i$ the attenuation provided by splitter $46_i$ of rank i, the following relations are obtained:

$$I_i = IB_i + Spl_i + \ldots + Spl_i;$$

$$CB_i - I_i \geq DIR; \text{ and}$$

for any j different from i:

$$X_{ij} + C_jB_i + AF_jB_i + Spl_i + \ldots + Spl_j \leq I_i.$$

Figure 9:
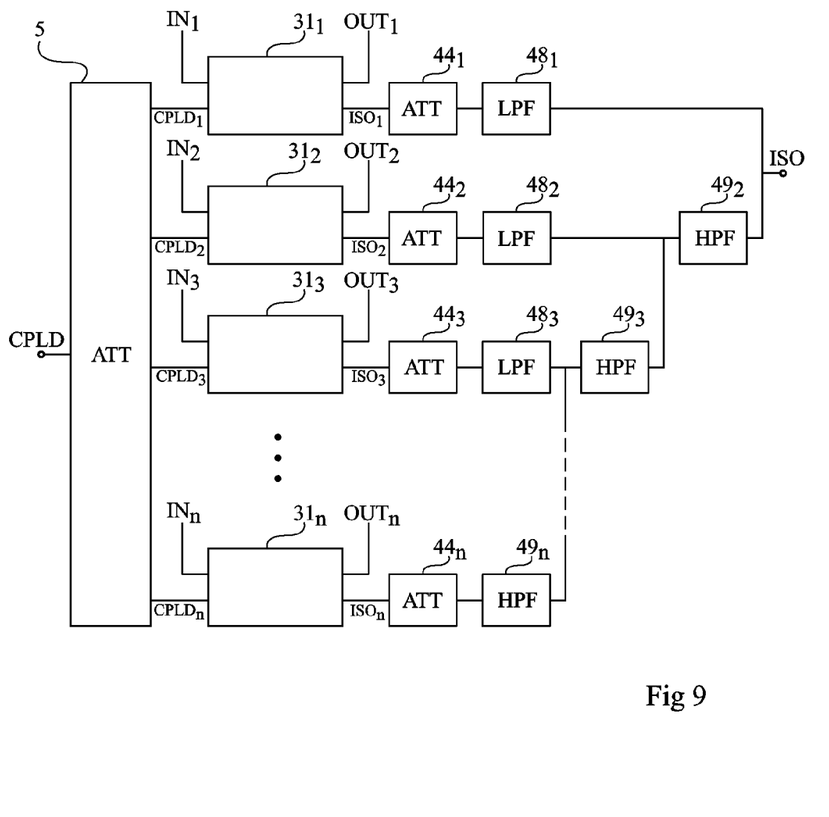
FIG. 9 details another embodiment of the coupling circuit of FIG. 4.

FIG. 9 shows still another embodiment of a coupling circuit.

As compared with the embodiment of FIG. 6, the attenuators are placed on the side of terminals $ISO_i$ rather than on the side of terminal ISO. Further, the filters are in cascade at the level of the different paths. Each path, except for the last one, n, comprises, in series with its attenuator $44i$, a low-pass filter $48_i$ (with i ranging from 1 to n−1) filtering all the frequencies greater than the frequency band of current path i. Further, each path, except for the first one, is connected to the output of the low-pass filter $48_{i-1}$ of the previous path by a high-pass filter $49_i$ cutting off all frequencies below the frequency band of the current path. Terminal ISO is connected to the outputs of filters $48_1$ and $49_2$.

Such an embodiment enables forming simpler filters, a bandpass filter being generally associated, in practice, with a high-pass filter.

For selectivity reasons, the low-pass and high-pass filters are at least of order 2 and preferably of order 3.

Using the notations defined in relation with FIG. 6, and noting $LF_iB_j$ the attenuation provided by filter $48_i$ in band j and $HF_iB_j$ the attenuation provided by filter $49_i$ in band j, the following relations are obtained:

$$I_i = IB_i + Att_i;$$

$$CB_i - I_i \geq DIR;$$

for any j smaller than i:

$$X_{ij}+C_jB_i+Att_j+LF_jB_i \leq I_i; \text{ and}$$

for any j greater than i:

$$X_{ij}+C_jB_i+Att_j+HF_{j-1}B_i+ \ldots +HF_iB_i \leq I_i.$$

FIGS. 10A to 10D show examples of low-pass and high-pass filters that can be formed in network 4.

Figure 10A:
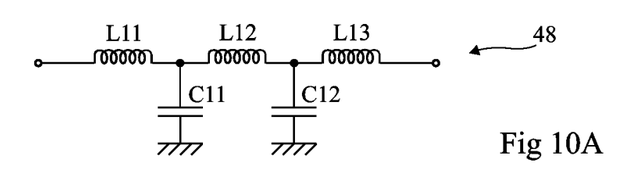
FIGS. 10A, 10B, 10C, and 10D show embodiments of filters.

FIG. 10A shows an example of a low-pass filter 48 of order 3. Three inductances L11, L12 and L13 are in series and the junction points of this series association are directly grounded by capacitors, respectively C11 and C12.

Figure 10B:
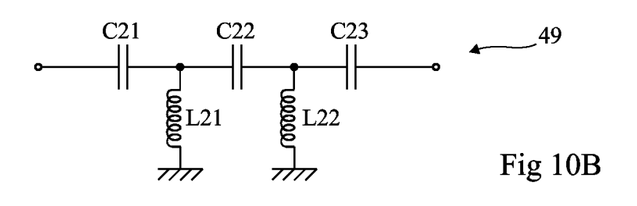

FIG. 10B shows an example of a high-pass filter 49 of order 3. Three capacitors C21, C22 and C23 are in series and the junction points of this series association are directly grounded by inductances, respectively L21 and L22.

Figure 10C:
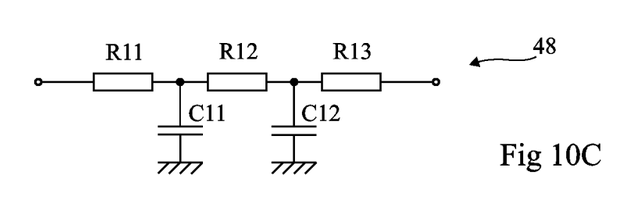
Figure 10D:
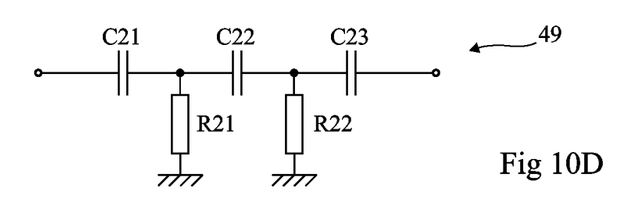

FIGS. 10C and 10D show other examples of respective low-pass and high-pass filters 48 and 49. As compared with FIGS. 10A and 10B, inductances L11, L12, L13, L21, and L22 are replaced with resistors, respectively R11, R12, R13, R21, and R22.

The choice between inductive or resistive elements depends, for example, on the available technology and especially on the possibility of easily integrating inductive elements in this technology. The forming, in integrated fashion, of resistive and capacitive devices is generally easier.

Various embodiments have been described, various alterations and modifications will occur to those skilled in the art. In particular, the dimensions to be given to the different components of the described coupling circuit are within the abilities of those skilled in the art based on the functional indications given hereabove and on the intrinsic characteristics of the different couplers used. Further, although the present invention has been described with a more specific reference to a transmission chain, it also applies to a multi-band coupling circuit for a reception chain.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A multiband coupling circuit comprising:
   a number of paths equal to the number of frequency bands, each path having a first terminal and a second terminal;
   a third terminal and a fourth terminal;
   a number of distributed couplers equal to the number of paths, all couplers being identical and sized according to the highest frequency band, and each coupler comprising a first conductive line between first and second ports connected to the first and second terminals of the concerned path, and a second conductive line coupled to the first one between third and fourth ports;
   a first set of attenuators between the third ports of the couplers and the third terminal of the circuit; and
   an array of filters between the fourth ports of the couplers and the fourth terminal of the circuit.

2. The circuit of claim 1, further comprising a second set of attenuators associated with the filter array.

3. The circuit of claim 2, wherein said array comprises, for each path, a filter sized to let through the frequency band of the concerned path, in series with an attenuator.

4. The circuit of claim 2, wherein said array comprises:
   for each path except for the last one, a low-pass filter for the frequencies of the current path and of the paths of lower rank in series with an attenuator, this series association being, for the first path, connected to the fourth terminal of the circuit; and
   for each path except for the first one, a high-pass filter for the frequencies of the current path and of the paths of higher rank, connected to the low-pass filter of the path of lower rank.

5. The circuit of claim 2, wherein the filters and attenuators are sized based on the following relations:
   isolation $I_i$ in band i is equal ($I_i=IB_i+Att_i$) to isolation $IB_i$ of the coupler of path i, plus attenuation $Att_i$ provided by the attenuator of path i;
   the directivity in band i corresponds to coupling factor $CB_i$ of the coupler of path i, minus isolation $I_i$ in band i such as calculated hereabove, and is greater than or equal ($CB_i - I_i \geq DIR$) to the minimum directivity DIR desired for all the paths.

6. The circuit of claim 5 wherein said array comprises, for each path, a filter sized to let through the frequency band of the concerned path, in series with an attenuator, and wherein the filters and attenuators are sized by further taking into account the fact that the coupling of an antenna coupled to the second port of the coupler of a path i, in a frequency band of another path j, corresponds to the sum ($X_{ij}+C_jB_i+AF_jB_i+Att_j$) of coupling $X_{ij}$ between the antennas connected to the second ports of the couplers of paths i and j, of coupling factor $C_jB_i$ of the coupler of path j in band i, of attenuation $AF_jB_i$ introduced by the filter of path j in band i, and of attenuation $Att_j$ introduced by the attenuator of path j, and is smaller than or equal to isolation $I_i$ in band i.

7. The circuit of claim 5, wherein said array comprises:
   for each path except for the last one, a low-pass filter for the frequencies of the current path and of the paths of lower rank in series with an attenuator, this series association being, for the first path, connected to the fourth terminal of the circuit;
   for each path except for the first one, a high-pass filter for the frequencies of the current path and of the paths of higher rank, connected to the low-pass filter of the path of lower rank; and
   wherein the filters and attenuators are sized by further taking into account the fact that that the coupling of an antenna coupled to the second port of the coupler of a path i, in a frequency band of another path j, is smaller than or equal to isolation $I_i$ in band i and corresponds:
   for any path j of smaller rank than rank i, to the sum ($X_{ij}+C_jB_i+Att_j+LF_jB_i$) of coupling $X_{ij}$ between the antennas connected to the second ports of the couplers of paths i and j, of coupling factor $C_jB_i$ of the coupler of path j in band i, of attenuation $LF_jB_i$ introduced by the low-pass filter of path j in band i, and of attenuation $Att_j$ introduced by the attenuator of path j; and
   for any path j of rank greater than rank i, to the sum ($X_{ij}+C_jB_i+Att_j+HF_{j-1}B_i+ \ldots +HF_iB_i$) of coupling $X_{ij}$ between the antennas connected to the second ports of the couplers of paths i and j, of coupling factor $C_jB_i$ of the coupler of path j in band i, of the sum of attenuations $LF_jB_i$ introduced by the high-pass filters of paths j−1 to i in band i, and of attenuation $Att_j$ introduced by the attenuator of path j.

8. The circuit of claim 1, further comprising a set of resistive splitters in cascade between the filters and the fourth terminal.

9. The circuit of claim 8, wherein a terminal of the splitter associated with the last path is grounded by a resistive element having a value which is triple that of respective resistive elements of the splitters.

10. The circuit of claim 8, wherein the filters and splitters are sized based on the following relations:
   isolation $I_i$ in band i is equal ($I_i=IB_i+Spl_1+ \ldots +Spl_i$) to isolation $IB_i$ of the coupler of path i, plus the sum of the attenuations provided by the splitters between the first path and path i;
   the directivity in band i corresponds to coupling factor $CB_i$ of the coupler of path i, minus isolation $I_i$ in band i such as calculated hereabove, and is greater than or equal ($CB_i-I_i \geq DIR$) to the minimum directivity DIR desired for all the paths; and
   the coupling of an antenna connected to the second port of the coupler of a path i, in a frequency band of another path j, corresponds to the sum ($X_{ij}+C_jB_i+AF_jB_i+Spl_1+ \ldots +Spl_j$) of coupling $X_{ij}$ between the antennas connected to the second ports of the couplers of paths i and j, of coupling factor $C_jB_i$ of the coupler of path j in band i, of attenuation $AF_jB_i$ provided by the filter of path j in band i, and of the sum of the attenuations provided by the separators between the first path and path j, and is smaller than or equal to isolation $I_i$ in band i.

11. A multiband coupling circuit comprising:
   a plurality of distributed couplers, each assigned to a corresponding frequency band and each having a first port defining a first terminal of the coupling circuit, a second port defining a second terminal of the coupling circuit, a third port and a fourth port, wherein the coupling circuit has a plurality of first terminals and a plurality of second terminals;
   a first array including attenuators respectively connected between the third port of each distributed coupler and a third terminal of the coupling circuit; and
   a second array including filters respectively connected between the fourth port of each distributed coupler and a fourth terminal of the coupling circuit.

12. A multiband coupling circuit as defined in claim 11, wherein each of the distributed couplers includes a first conductive line connected between the first port and the second port, and a second conductive line coupled between the third port and the fourth port, wherein the first conductive line is electromagnetically coupled to the second conductive line.

13. A multiband coupling circuit as defined in claim 11, wherein the distributed couplers are identical.

14. A multiband coupling circuit as defined in claim 11, wherein the second array includes, for each of the distributed couplers, a filter configured to pass the corresponding frequency band in series with an attenuator.

15. A multiband coupling circuit as defined in claim 14, wherein the filter for each corresponding frequency band, except a highest corresponding frequency band and a lowest corresponding frequency band, comprises a bandpass filter.

16. A multiband coupling circuit as defined in claim 15, wherein the filter for the highest corresponding frequency band comprises a high-pass filter and the filter for the lowest corresponding frequency band comprises a low-pass filter.

17. A multiband coupling circuit as defined in claim 11, wherein the second array includes, for each of the distributed couplers, a filter configured to pass the corresponding frequency band, the second array further comprising a set of resistive splitters in a cascade connection between the filters and the fourth terminal.

18. A multiband coupling circuit as defined in claim 17, wherein a splitter associated with a highest corresponding frequency band is grounded by a resistive element having a value which is three times that of resistive elements of the splitters.

19. A multiband coupling circuit as defined in claim 11, wherein the second array includes, for each of the distributed couplers, an attenuator, for each corresponding frequency band except a highest corresponding frequency band, a low-pass filter, and a set of high-pass filters in a cascade connection between the low-pass filters and the fourth terminal.

20. A multiband coupling circuit as defined in claim 14, wherein the filters and attenuators are sized based on the following relations:
   isolation $I_i$ in band i is equal ($I_i=IB_i+Att_i$) to isolation $IB_i$ of the coupler of path i, plus attenuation $Att_i$ provided by the attenuator of path i;
   the directivity in band i corresponds to coupling factor $CB_i$ of the coupler of path i, minus isolation $I_i$ in band i such as calculated hereabove, and is greater than or equal ($CB_i-I_i \geq DIR$) to the minimum directivity DIR desired for all the paths.

21. A multiband coupling circuit as defined in claim 20, wherein the filters and attenuators are sized by further taking into account the fact that the coupling of an antenna coupled to the second port of the coupler of a path i, in a frequency band of another path j, corresponds to the sum ($X_{ij}+C_jB_i+AF_jB_i+Att_j$) of coupling $X_{ij}$ between the antennas connected to the second ports of the couplers of paths i and j, of coupling factor $C_jB_i$ of the coupler of path j in band i, of attenuation $AF_jB_i$ introduced by the filter of path j in band i, and of attenuation $Att_j$ introduced by the attenuator of path j, and is smaller than or equal to isolation $I_i$ in band i.

22. A multiband coupling circuit as defined in claim 20, wherein said array comprises:
   for each path except for the last one, a low-pass filter for the frequencies of the current path and of the paths of lower rank in series with an attenuator, this series association being, for the first path, connected to the fourth terminal of the circuit;
   for each path except for the first one, a high-pass filter for the frequencies of the current path and of the paths of higher rank, connected to the low-pass filter of the path of lower rank; and
   wherein the filters and attenuators are sized by further taking into account the fact that that the coupling of an antenna coupled to the second port of the coupler of a path i, in a frequency band of another path j, is smaller than or equal to isolation $I_i$ in band i and corresponds:
   for any path j of smaller rank than rank i, to the sum ($X_{ij}+C_jB_i+Att_j+LF_jB_i$) of coupling $X_{ij}$ between the antennas connected to the second ports of the couplers of paths i and j, of coupling factor $C_jB_i$ of the coupler of path j in band i, of attenuation $LF_jB_i$ introduced by the low-pass filter of path j in band i, and of attenuation $Att_j$ introduced by the attenuator of path j; and
   for any path j of rank greater than rank i, to the sum ($X_{ij}+C_jB_i+Att_j+HF_{j-1}B_i+ \ldots +HF_iB_i$) of coupling $X_{ij}$ between the antennas connected to the second ports of the couplers of paths i and j, of coupling factor $C_jB_i$ of the coupler of path j in band i, of the sum of attenuations $LF_jB_i$ introduced by the high-pass filters of paths j−1 to i in band i, and of attenuation $Att_j$ introduced by the attenuator of path j.

23. A multiband coupling circuit as defined in claim 17, wherein the filters and splitters are sized based on the following relations:
   isolation $I_i$ in band i is equal ($I_i=IB_i+Spl_1+ \ldots +Spl_i$) to isolation $IB_i$ of the coupler of path i, plus the sum of the attenuations provided by the splitters between the first path and path i;
   the directivity in band i corresponds to coupling factor $CB_i$ of the coupler of path i, minus isolation $I_i$ in band i such as calculated hereabove, and is greater than or equal ($CB_i - I_i \geq DIR$) to the minimum directivity DIR desired for all the paths; and the coupling of an antenna connected to the second port of the coupler of a path i, in a frequency band of another path j, corresponds to the sum ($X_{ij} + C_jB_i + AF_jB_i + Spl_1 + \ldots + Spl_j$) of coupling $X_{ij}$ between the antennas connected to the second ports of the couplers of paths i and j, of coupling factor $C_jB_i$ of the coupler of path j in band i, of attenuation $AF_jB_i$ provided by the filter of path j in band i, and of the sum of the attenuations provided by the separators between the first path and path j, and is smaller than or equal to isolation $I_i$ in band i.

24. A muitiband coupling circuit as defined in claim 12, wherein the second conductive line of each of the distributed couplers comprises a first section coupled between the third port of the coupling circuit and a first attenuator, and a second section coupled between the fourth port of the coupling circuit and a second attenuator.

* * * * *

UNITED STATES PATENT AND TRADEMARK OFFICE
CERTIFICATE OF CORRECTION

PATENT NO. : 8,810,333 B2  
APPLICATION NO. : 13/234041  
DATED : August 19, 2014  
INVENTOR(S) : Claire Laporte et al.

Page 1 of 1

It is certified that error appears in the above-identified patent and that said Letters Patent is hereby corrected as shown below:

In the Specification:

In Column 7, Line 59, "$42_i$;" should read --$42_j$--;

In Column 8, Line 35, "$I_i = IB_i + Spl_i + ... + Spl_i$" should read --$I_i = IB_i + Spl_1 + ... + Spl_i$--; and

In Column 8, Line 40, "$X_{ij} + C_jB_i + AF_jB_i + Spl_i + ... + Spl_j \leq I$" should read --$X_{ij} + C_jB_i + AF_jB_i + Spl_1 + ... + Spl_j \leq I$--.

In the Claims:

In Column 10, Line 24, Claim 6, "$(X_{ij} + C_iB_i + AF_jB_i + Att_j)$" should read --$(X_{ij} + C_jB_i + AF_jB_i + Att_j)$--; and In Column 13, Line 14, Claim 24, "muitiband" should read --multiband--.

Signed and Sealed this  
Twenty-eighth Day of October, 2014

Michelle K. Lee  
*Deputy Director of the United States Patent and Trademark Office*